(12) United States Patent
Popov et al.

(10) Patent No.: US 8,012,247 B2
(45) Date of Patent: Sep. 6, 2011

(54) GAS TREATMENT UNITS

(76) Inventors: Serguei A. Popov, Houston, TX (US); Michael S. Green, Tyler, TX (US)

( * ) Notice: Subject to any disclaimer, the term of this patent is extended or adjusted under 35 U.S.C. 154(b) by 248 days.

(21) Appl. No.: 12/422,330

(22) Filed: Apr. 13, 2009

(65) Prior Publication Data
US 2010/0258007 A1    Oct. 14, 2010

(51) Int. Cl.
*B01D 53/02* (2006.01)
(52) U.S. Cl. ............................................. 96/143; 96/355
(58) Field of Classification Search .................... 96/143, 96/146, 243, 301, 355; 585/802; 95/175, 95/177
See application file for complete search history.

(56) References Cited

U.S. PATENT DOCUMENTS
3,659,401 A * 5/1972 Giammarco .................... 95/175
* cited by examiner

*Primary Examiner* — Robert A Hopkins
(74) *Attorney, Agent, or Firm* — Richard A. Fagin

(57) ABSTRACT

A gas treatment unit includes an absorber, a liquid-jet ejector, a gas-liquid separator, a regenerator and a pump. A liquid outlet of the regenerator is connected to an inlet of the pump. An outlet of the pump is connected to a liquid inlet of the absorber. A liquid outlet of the absorber is connected to a liquid inlet of the jet-ejector. A regenerator gas outlet is connected to a gas inlet of the liquid-jet ejector. A liquid-gas outlet of the liquid-jet ejector is connected to an inlet of the separator. A liquid outlet of the separator is connected to a liquid inlet of the regenerator.

20 Claims, 5 Drawing Sheets

GAS TREATMENT UNITS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of gas treatment devices. More particularly, the invention relates to gas sweetening and gas drying devices.

2. Background Art

U.S. Pat. No. 2,437,288 describes a purification and separation unit for gas mixtures comprising an absorber-regenerator system, where the absorber and regenerator columns are connected by piping through heat exchangers and water coolers, and where liquid solvent is moved by a pump. One disadvantage of the unit described in the '288 patent is low energy efficiency of the solvent circulation where pressure in the absorber is required to be higher than in the regenerator due to gas treatment conditions. See, for example, *Deep Crude Conversion: Process and Ecological Aspects*, Kaminski, E. F., Khavkin, V. A., Moscow, 2001. Also see, U.S. Pat. No. 3,851,041.

In the circumstances described in the foregoing publications, the operating pressure in the regenerator is substantially lower than the pressure in the absorber. Solvent recirculation is established and maintained by a circulating pump moving solvent from the regenerator to the absorber. Then, rich solvent, after contact with treated gas in the absorber under higher pressure than in regenerator, flows back to the regenerator as a result of the pressure differential between higher pressure in the absorber and lower pressure in the regenerator. The static pressure differential, as well as the kinetic energy of flowing rich solvent fluid dissipates as friction in flow control instrumentation that maintains the liquid level in the bottom of the absorber. The foregoing results in low energy efficiency of the solvent recycling circuit. The foregoing explanation is also applicable to other cases where gas compression is required.

SUMMARY OF THE INVENTION

A gas treatment unit according to one aspect of the invention includes an absorber, a regenerator, and a pump, wherein a liquid outlet of the absorber is connected to a liquid inlet of the regenerator through a liquid-jet ejector. The liquid inlet port of the ejector is connected to the absorber liquid outlet. A suction port is connected to the regenerator's gaseous product outlet. A two-phase outlet port is connected to a separator whose liquid phase outlet port is connected to the regenerator feed inlet.

Another example of a gas treatment unit according to the present invention includes an absorber, a regenerator, and a pump, wherein the liquid outlet from the absorber is connected to a liquid inlet of the regenerator through a liquid-jet ejector. A liquid inlet port of the ejector is connected to the absorber's liquid outlet. A suction port is connected to the regenerator gaseous product outlet, and an outlet port is connected to a heat exchanger where a liquid medium separated from gas in the separator is heated. A regenerator bottom product is then fed to the regenerator.

In some examples, the heat exchanger can be located between the liquid-jet ejector and the feed inlet to the regenerator, and alternatively between the absorber and the jet-ejector.

Other aspects and advantages of the invention will be apparent from the following description and the appended claims.

DETAILED DESCRIPTION

Figure 1:
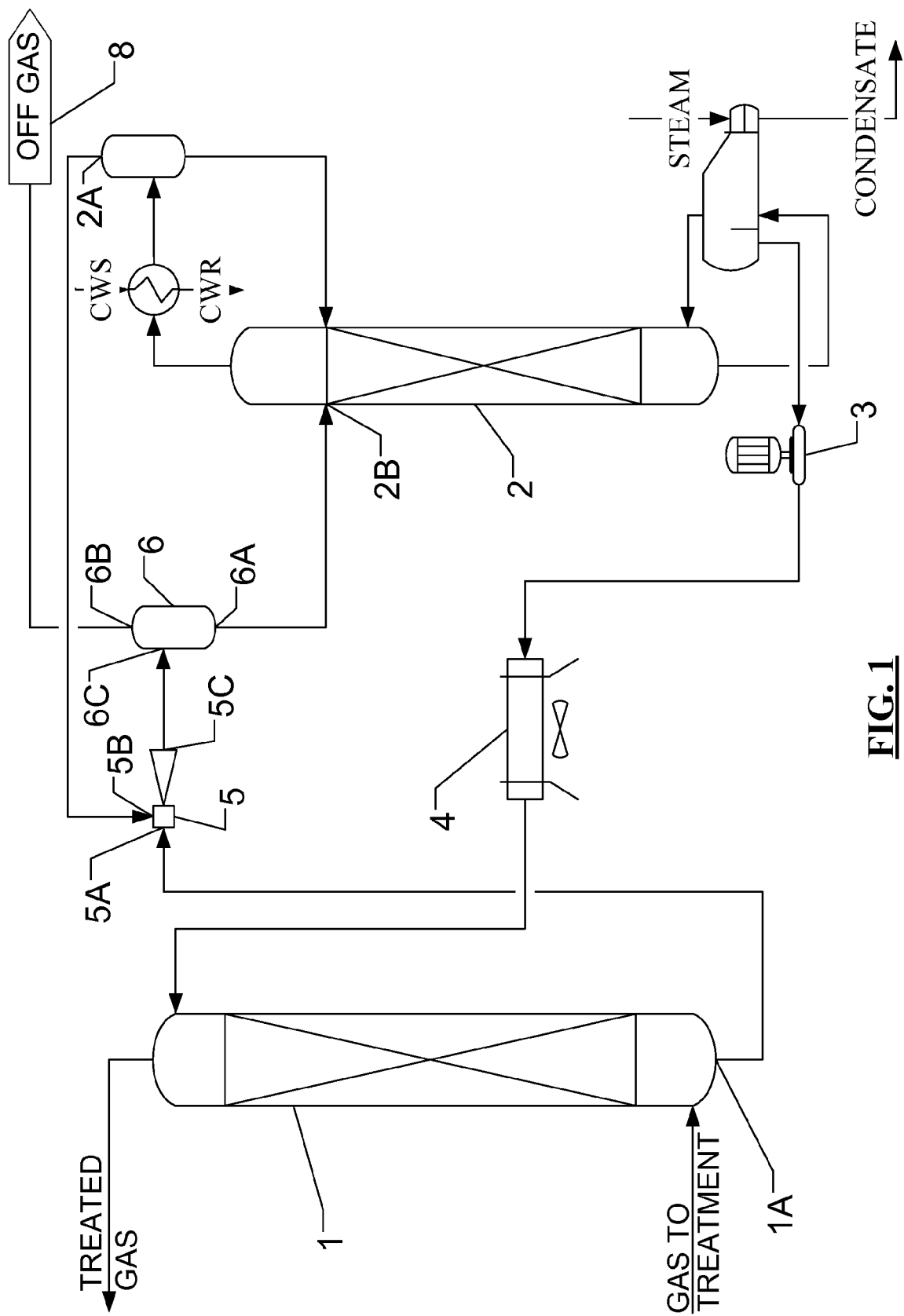
FIG. 1 is a schematic diagram of an example gas treatment unit wherein a rich solvent from the bottom of an absorber is conducted to a liquid-jet ejector, wherein the liquid is used as a motive fluid and the gaseous phase from a regenerator is conducted to the liquid-jet ejector for compression.

The present invention is intended to increase operational reliability and efficiency of gas treatment units and to extend the range of its operational characteristics. The foregoing benefits may be obtained as explained below.

Experiments have shown that a liquid-jet ejector connected through its liquid inlet port to a high pressure medium source, and through its gas inlet port to the evacuated medium outlet provides a conversion of static pressure of the high pressure medium into kinetic energy entraining a gaseous phase from the gas inlet port, and then to the static pressure of two-phase fluid its outlet, consequently reducing pressure of evacuated medium at its source. As a result, the pressure differential of rich solvent flowing between the absorber and the regenerator is converted to a static pressure differential between the regenerator gas product, which lowers a pressure in the regenerator and reduces the amount of heat needed to strip rich solvent of contaminants to complete solvent regeneration.

A series of experiments has also shown that the liquid-jet gas ejector can discharge at a two-phase outlet to any destination if the pressure at the destination is equal to or lower than that maximum pressure at the ejector outlet. This phenomenon allows installing the ejector in combination with a heat exchanger. Two example implementations described below based on the foregoing phenomenon can provide significant improvement in energy efficiency of a gas treatment unit.

Another physical phenomenon determined from experiments with liquid-jet ejectors is the effect of the travel time of the motive liquid between the ejector's liquid nozzle tip and the area in the ejector's diffuser throat where a two-phase fluid accelerates to sonic velocity with respect to the ejector's efficiency and reliability if the ejector motive fluid is oversaturated with absorbed gases. It was determined from experimentation that the ejector efficiency declines if the travel time is longer than about one quarter of a second (0.25 sec.) for flashing rich solvent used as a motive fluid, due to vaporizing of absorbed light components in the ejector's low pressure area. Such vaporization consequently loads the ejector with additional flashing gases and therefore reduces the ejector throughput. At the same time, it was determined by experimentation that the travel time also has a minimum limit. Below the minimum travel time limit, the ejector efficiency decreases due to loss of contact between the motive fluid and the pumped gaseous phase.

The motive liquid travel time can therefore be optimized based on the foregoing experiments performed using ejectors, wherein the flashing motive fluid is determined from $1*10^{-4}$ second to 0.25 second. The flashing motive fluid in this case is interpreted as fluid boiling at the pressure and temperature that exist at the ejector inlet and in its mixing chamber. The interval from $1*10^{-4}$ second to 0.25 second appears to be critical for the ejector motive fluid travel time in this invention. Outside of these travel time limits, it is believed that ejector efficiency will be substantially lower.

Travel time can be measured directly in the ejector or calculated based on respective parameters. The experiments demonstrate that the ejector could be successfully built based on empirical calculation method, and not only based on direct measurements.

The calculation method determining the travel distance for motive liquid under the flashing conditions uses following empirical correlation:

$$\tau_{travel} = \frac{B_O}{\sqrt{\frac{2*g*(P_{LIQUID} - P_{MIXCHAMBER})}{\gamma_{LIQUID}}}} \quad (1)$$

wherein $\tau_{travel}$ represents the ejector motive liquid travel time between the liquid nozzle outlet tip and the middle of the ejector throat; $B_O$ represents the linear distance between the liquid nozzle outlet tip and the midpoint of the ejector cylindrical throat; $P_{LIQUID}$ represents the pressure of the motive fluid at the inlet of the ejector liquid nozzle; $P_{MIX\ CHAMBER}$ represents the pressure in the mixing chamber of the ejector at the outlet of the ejector nozzle outlet tip; $\gamma_{LIQUID}$ represents the actual density of the motive liquid at the ejector nozzle liquid inlet and g represents the acceleration of gravity. A liquid jet-ejector made using the foregoing criteria is believed to have a maximum efficiency.

Another example of the gas treatment unit includes an absorber, a regenerator, a separator, a liquid-jet ejector and other associated absorber-ejector-regenerator piping and equipment wherein the liquid inlet port of the jet-ejector is connected to the bottom of the absorber, a two-phase fluid discharge port of the jet-ejector is connected to the separator, the gas inlet port of the ejector is connected to a source of low pressure gas, the gas outlet port of the separator is connected to a high pressure gas consumer conduit (high and low herein relate the relative magnitudes of the pressure in the gas source and in the consumer conduit), and the liquid outlet port of separator is connected to the regenerator inlet directly or through piping and other equipment. The present example provides the capability to use a pressure differential between the absorber bottom and certain downstream equipment to compress gas originating outside of the absorber-regenerator circuit. The separator in this example can be a two-phase or a three-phase separator.

Thus, due to the described improvements, a gas treatment unit according to the present invention can have higher energy efficiency and reliability regardless of the operating back pressure at the outlet of the regenerator, and can have an extended control range.

Referring to FIG. 1, an example gas treatment unit comprises an absorber 1, a regenerator 2, a circulating pump 3, a cooler 4, a liquid jet-ejector 5, and a separator 6. The ejector 5 liquid inlet 5A is imparted with rich solvent (i.e., solvent carrying dissolved material), and it is in fluid connection to the bottom 1A of the absorber 1. The ejector 5 gas inlet 5B is imparted with gas discharged from the gas outlet 2A of regenerator 2. The two-phase fluid outlet 5C of the ejector 5 is conducted to the inlet 6C of the separator 6, wherein a separated liquid phase outlet 6A is connected to the inlet of the regenerator 2. A gas phase outlet 6B of the separator 6 is conducted to a consumer conduit 8.

Figure 2:
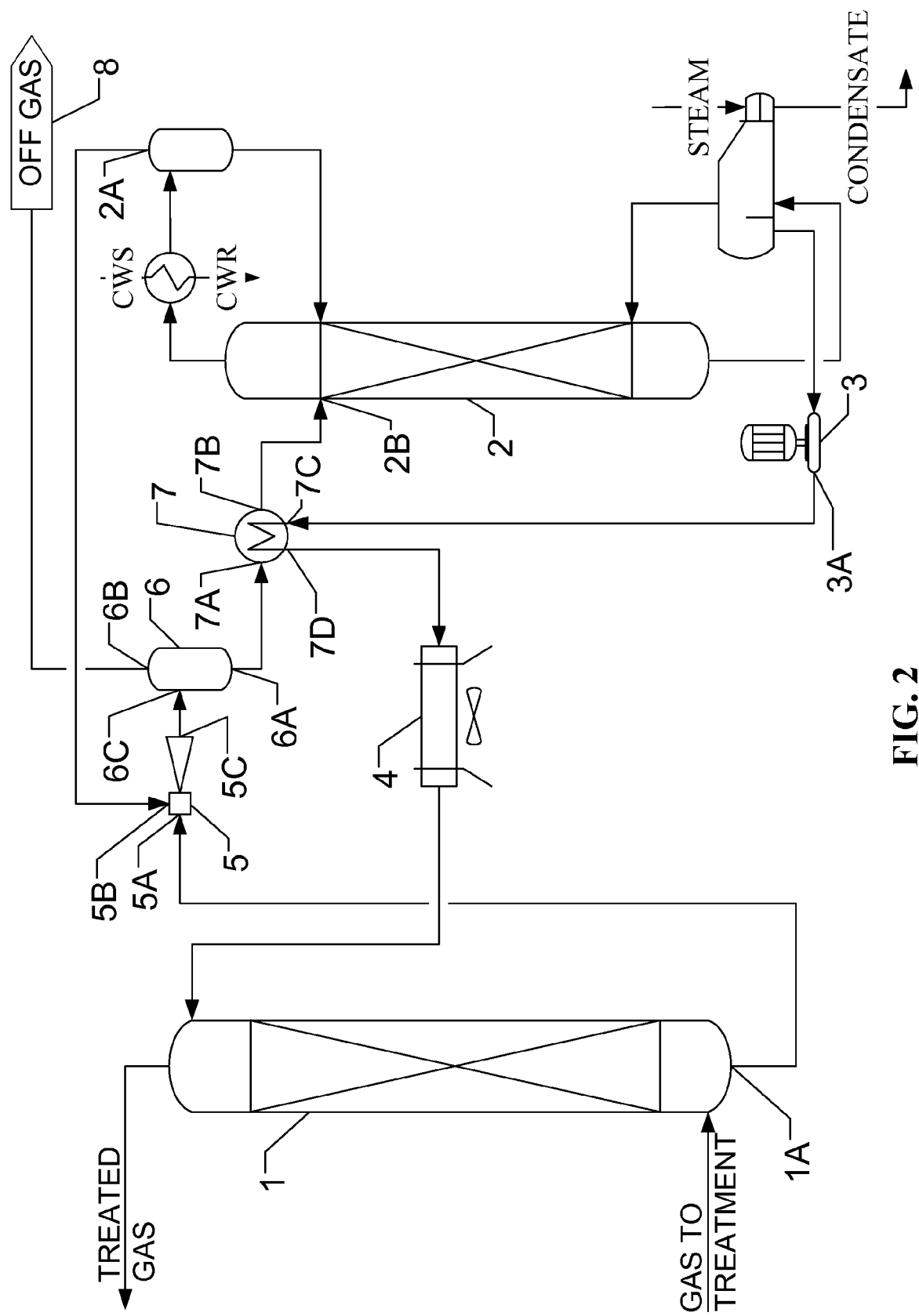
FIG. 2 is a schematic diagram of an example gas treatment unit, wherein a heat exchanger conducts heat from a lean solvent moving from the bottom of a regenerator to a liquid phase drawn from a liquid-jet ejector separator prior to feed to a regenerator.

Another example gas treatment unit shown in FIG. 2 comprises the same main elements as the example shown in FIG. 2. The difference between the previous and the present example is a heat exchanger 7, wherein a cold inlet 7A is connected to the liquid outlet 6B of the separator 6, a cold outlet 7B of the heat exchanger 7 is connected to the inlet 2B of the regenerator 2. A hot inlet 7C of the heat exchanger 7 is imparted with lean solvent and is connected to the outlet 3A of the circulating pump 3. A hot outlet 7D of the heat exchanger 7 is connected to the cooler 4. In addition to the foregoing component arrangement, the pump 3 can be located downstream of heat exchanger 7.

Figure 3:
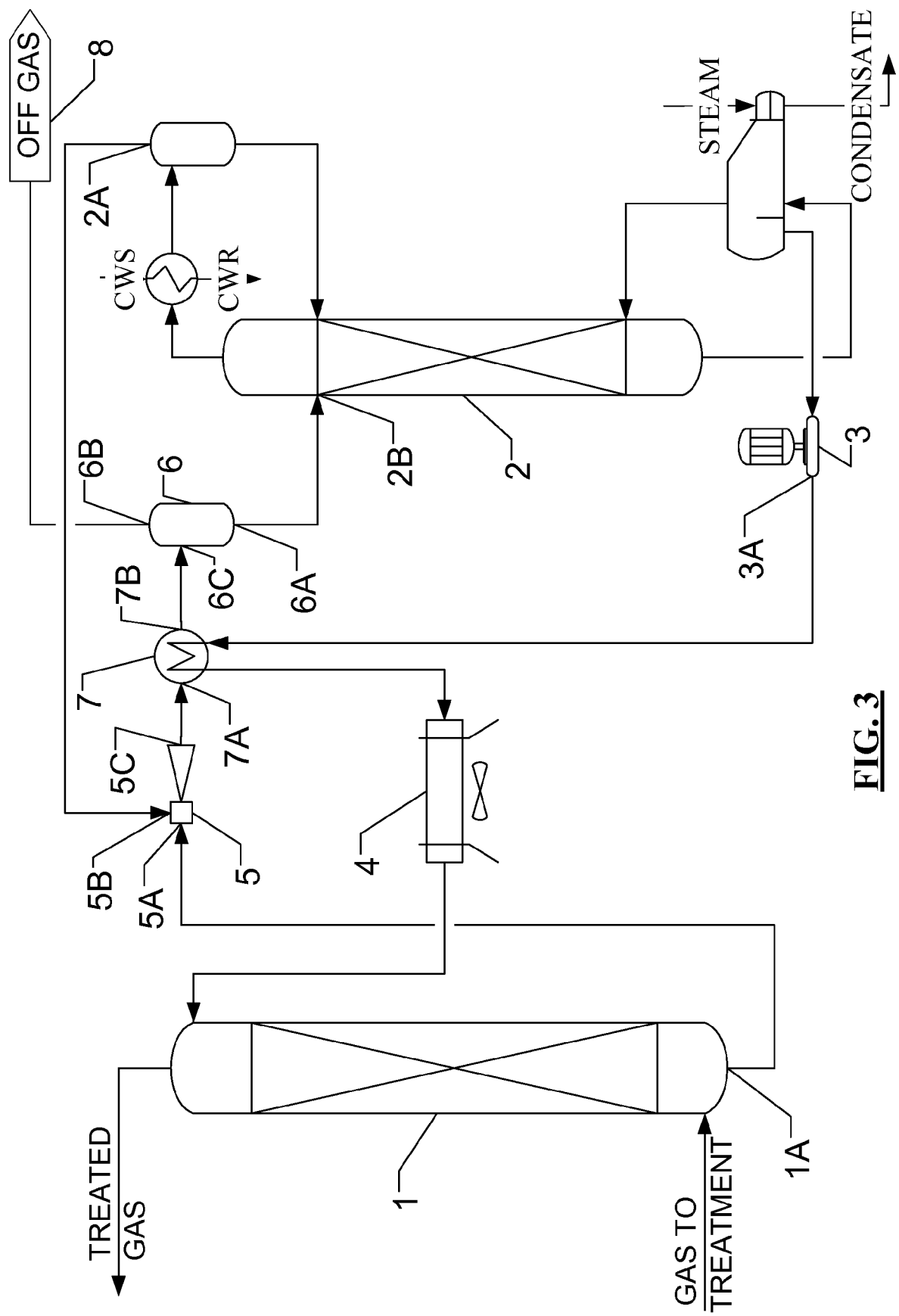
FIG. 3 is a schematic diagram of an example gas treatment unit, wherein a heat exchanger is located between a liquid-jet ejector outlet and a two-phase separator, and wherein the heat exchanger conducts heat from a lean solvent from the bottom of a regenerator to a two-phase fluid discharged from the ejector.

Another example gas treatment unit shown in FIG. 3 comprises the same elements as the example shown in FIG. 2. The difference between the previous example and the present example is that heat exchanger 7 in the present example is located between the ejector 5 and the separator 6.

Figure 5:
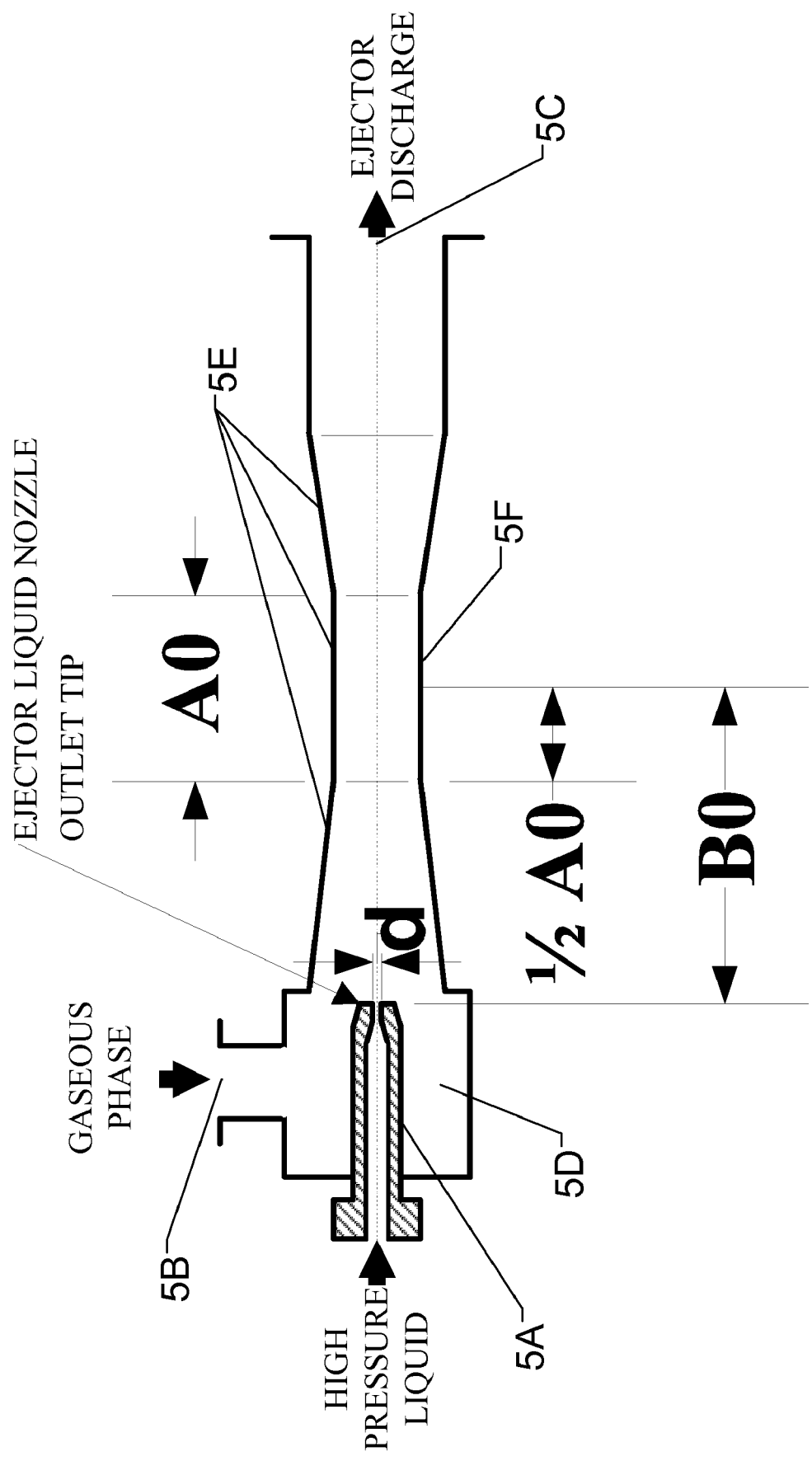
FIG. 5 is a schematic diagram of an example liquid-jet ejector, wherein a travel distance between an ejector liquid nozzle outlet tip and a supersonic area where a two-phase fluid increases in pressure is shown as a distance between the ejector liquid nozzle outlet tip and the middle of a cylindrical part of the ejector diffuser throat.

The liquid jet-ejector 5 is shown in more detail in FIG. 5 and comprises a mixing chamber 5D having an ejector liquid nozzle 5A and an ejector gas phase inlet nozzle 5B. The liquid jet-ejector includes a converging-cylindrical-diverging diffuser throat 5E, wherein the travel distance of motive liquid under flashing conditions, $B_0$, is designated as the distance between the ejector liquid nozzle 5B outlet tip and the midpoint (½*$A_0$) of the cylindrical part 5F of the ejector diffuser throat 5E having a length $A_0$.

The gas treatment units operate as follows. Prior to starting the unit, the absorber 1, regenerator 2, pump 3 and connecting piping is filled with a required volume of a solvent, which can fill up as much as one half of the separator 6 space. The pump 3 delivers lean solvent to the cooler 4 and to the absorber 1, wherein it contacts treated gas fed through the inlet to the absorber 1. Treated gas is discharged to the consumer conduit 8 from the top of 1B the absorber 1. Rich solvent is discharged from the bottom 1A of absorber 1 and is conducted to the ejector 5 liquid inlet nozzle 5B, where it mixes with gas discharged from the regenerator 2. In the ejector 5, gas increases in pressure and a two-phase liquid discharged from the ejector 5 outlet nozzle is routed to the separator 6, where the liquid-gas mixture is separated into gas and liquid. Gas from the separator 6 is under higher pressure than in the regenerator and is discharged to a consumer destination conduit 8. Liquid from the separator 6 is fed to the regenerator 2, where it is absorbed by solvent in the absorber 1. Impurities are desorbed and discharged from the regenerator 2 as gas to the gas inlet port of the ejector 5. Regenerated lean solvent is drawn from the regenerator bottom 1A and is fed to the pump 3 inlet. Excess heat is taken from the system by the cooler 4. Thus, the liquid-jet ejector 5 uses rich solvent pressure surplus, converting it to the static pressure head of the discharged gas from the regenerator 2, consequently enabling reduction of the pressure in regenerator 2. Therefore the pressure in the absorber 1 is higher than the pressure in the regenerator 2, and the discharge pressure of gas from the regenerator at the outlet of the separator 6 is higher than the pressure in the regenerator 2.

In another example, the unit includes a heat exchanger 7 that exchanges heat from lean solvent to rich solvent. The heat exchanger is installed between the separator 6 and the feed inlet to the regenerator 2. The foregoing example unit is preferably used when the temperature of the liquid from the separator 6 is lower than the lean solvent temperature from the regenerator 2 bottom.

In another example of the unit a heat exchanger 7 is located between the ejector 5 two-phase outlet and the separator 6. The purpose of this exchanger is the same as described above.

Figure 4:
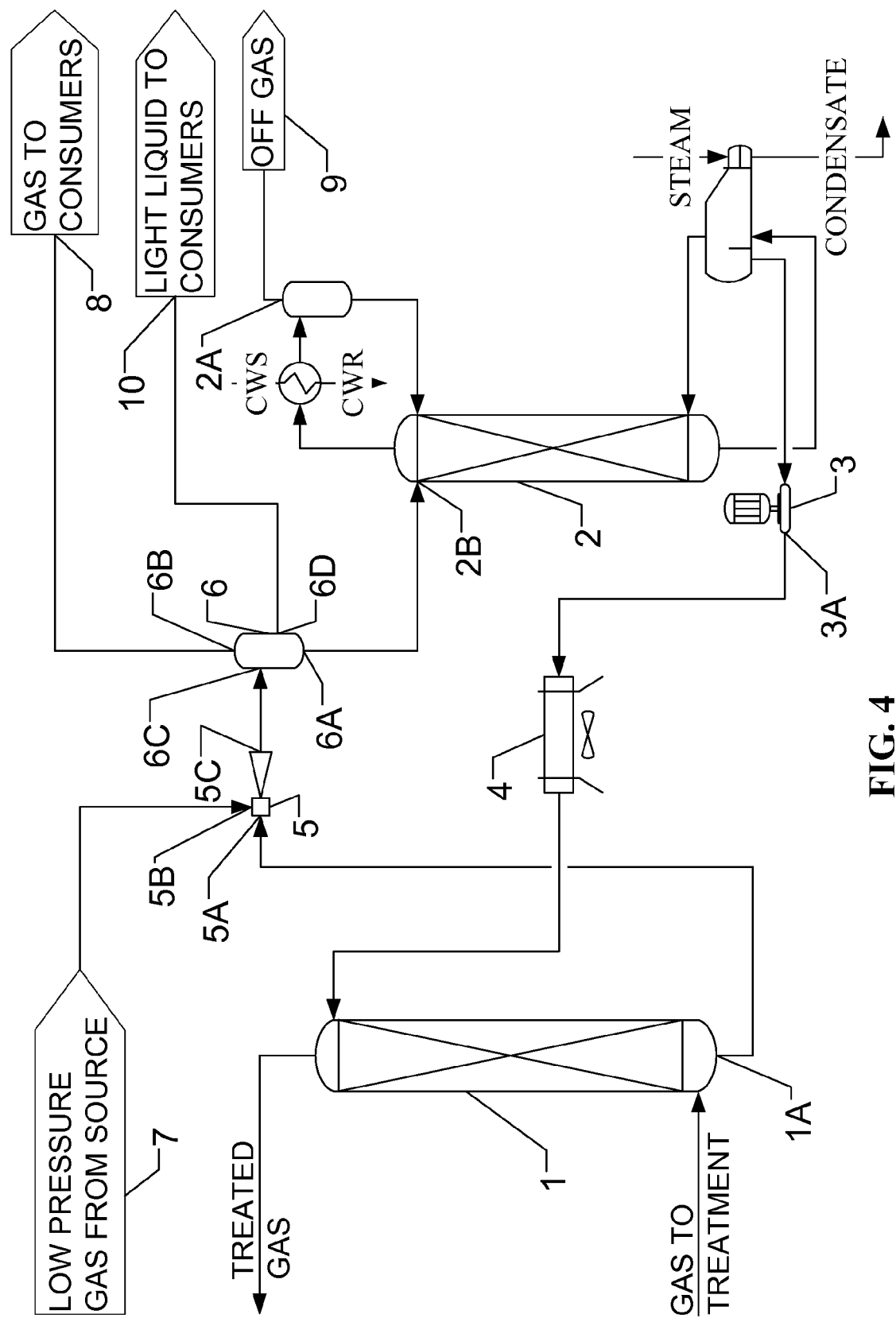
FIG. 4 is a schematic diagram of an example gas treatment unit, wherein a liquid-jet ejector is used to compress low pressure gases from other sources using as energy the differential pressure head of a rich solvent drawn from the bottom of an absorber, and which is used as a motive fluid.

Another example of the gas treatment unit is shown in FIG. 4 and includes an absorber, a regenerator, and a liquid-jet gas ejector. The liquid inlet of the ejector is connected to the liquid outlet of the absorber, the gas-liquid outlet of the ejector is connected to a two or three-phase separator. A gas inlet of the ejector is connected to a low pressure gas source. A heavy liquid phase outlet of the three phase separator is connected directly or through downstream piping and equipment to the liquid inlet of the regenerator. A light liquid phase outlet of the three separator is connected to a light liquid consumer conduit, and the gas phase outlet from the separator (two or three phase) is connected to a high pressure gas consumer conduit. The present example also may comprise a pump, wherein the inlet of the pump is connected to the liquid outlet of the absorber, and the outlet of the pump is connected to the liquid inlet of the ejector. The pump may be installed when the pressure differential between absorber liquid outlet and gas-liquid outlet of the ejector is not high enough to compress gases to the required pressure level.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A gas treatment unit comprising:
   an absorber;
   a liquid jet-ejector;
   a gas-liquid separator;
   a regenerator; and
   a pump, a liquid outlet of the regenerator connected to an inlet of the pump, an outlet of the pump connected to a liquid inlet of the absorber, a liquid outlet of the absorber connected to a liquid inlet of the jet-ejector, a regenerator gas outlet connected to a gas inlet of the jet-ejector, a liquid-gas outlet of the jet-ejector connected to an inlet of the separator, and a liquid outlet of the separator connected to a liquid inlet of the regenerator, wherein a liquid-gas mixture discharged from the jet-ejector is heated by liquid from a bottom of the regenerator before being conducted to the separator inlet for separation, and liquid discharged from the separator is conducted to the liquid inlet of the regenerator.

2. The gas treatment unit according to claim 1, wherein the liquid outlet of the separator is connected to the regenerator liquid inlet through a heat exchanger, whereby liquid from the separator is heated by liquid from the regenerator bottom before being conducted to the liquid inlet of the regenerator.

3. The gas treatment unit according to claim 1, wherein the liquid outlet of the absorber is connected to the jet-ejector liquid inlet, the jet-ejector liquid-gas outlet is connected to a two-phase separator, a liquid outlet of the two-phase separator is connected to the liquid inlet of the regenerator, the jet-ejector gas inlet is connected to gas source, and the separator gas outlet is connected to a consumer gas conduit.

4. The gas treatment unit according to claim 3, wherein the absorber liquid outlet is connected to the jet-ejector liquid inlet through the pump.

5. The gas treatment unit according to claim 1, wherein the absorber liquid outlet is connected to the jet-ejector liquid inlet, the jet-ejector liquid-gas outlet is connected to a three-phase separator, a heavier phase liquid outlet from the three-phase separator is connected to the liquid inlet of the regenerator, a lighter phase liquid outlet of the three-phase separator is connected to a light liquid consumer conduit, the jet-ejector gas inlet is connected to a gas source, and the separator gas outlet is connected to a consumer gas conduit.

6. The gas treatment unit according to claim 5, wherein the absorber liquid outlet is connected to the jet-ejector liquid inlet through the pump.

7. The gas treatment unit according to claim 1 wherein the jet-ejector comprises a mixing chamber having liquid and gas inlet nozzles, and an ejector diffuser throat wherein a motive liquid flows between an outlet tip of the ejector liquid inlet nozzle and a midpoint of a cylindrical part of a diffuser throat in the jet-ejector in a minimum of 0.0001 second.

8. The gas treatment unit according to claim 7, wherein the motive liquid flows between the ejector liquid nozzle outlet tip and the midpoint of the ejector diffuser throat in a maximum of 0.25 second.

9. The gas treatment unit according to claim 7 wherein a motive liquid flowing time between the ejector liquid nozzle outlet tip and the midpoint of the ejector diffuser throat is calculated using the formula:

$$\tau_{travel} = \frac{B_O}{\sqrt{\dfrac{2 * g * (P_{LIQUID} - P_{MIXCHAMBER})}{\gamma_{LIQUID}}}}$$

10. A gas treatment unit comprising:
    an absorber;
    a liquid jet-ejector;
    a gas-liquid separator;
    a regenerator; and
    a pump, a liquid outlet of the regenerator connected to an inlet of the pump, an outlet of the pump connected to a liquid inlet of the absorber, a liquid outlet of the absorber connected to a liquid inlet of the jet-ejector, a regenerator gas outlet connected to a gas inlet of the jet-ejector, a liquid-gas outlet of the jet-ejector connected to an inlet of the separator, and a liquid outlet of the separator connected to a liquid inlet of the regenerator wherein the absorber liquid outlet is connected to the jet-ejector liquid inlet, the jet-ejector liquid-gas outlet is connected to a three-phase separator, a heavier phase liquid outlet from the separator is connected to the liquid inlet of the regenerator, a lighter phase liquid outlet of the separator is connected to a light liquid consumer conduit, the jet-ejector gas inlet is connected to a gas source, and the separator gas outlet is connected to a consumer gas conduit.

11. The gas treatment unit according to claim 10, wherein the liquid outlet of the separator is connected to the regenerator liquid inlet through a heat exchanger, whereby liquid from the separator is heated by liquid from the regenerator bottom before being conducted to the liquid inlet of the regenerator.

12. The gas treatment unit according to claim 10, wherein a liquid-gas mixture discharged from the jet-ejector is heated by liquid from a bottom of the regenerator before being conducted to the separator inlet for separation, and liquid discharged from the separator is conducted to the liquid inlet of the regenerator.

13. The gas treatment unit according to claim 10, wherein the liquid outlet of the absorber is connected to the jet-ejector liquid inlet, the jet-ejector liquid-gas outlet is connected to a two-phase separator, a liquid outlet of the two-phase separator is connected to the liquid inlet of the regenerator, the jet-ejector gas inlet is connected to gas source, and the separator gas outlet is connected to a consumer gas conduit.

14. The gas treatment unit according to claim 13, wherein the absorber liquid outlet is connected to the jet-ejector liquid inlet through the pump.

15. The gas treatment unit according to claim 10, wherein the absorber liquid outlet is connected to the jet-ejector liquid inlet through the pump.

16. The gas treatment unit according to claim 10 wherein the jet-ejector comprises a mixing chamber having liquid and gas inlet nozzles, and an ejector diffuser throat wherein a motive liquid flows between an outlet tip of the ejector liquid inlet nozzle and a midpoint of a cylindrical part of a diffuser throat in the jet-ejector in a minimum of 0.0001 second.

17. The gas treatment unit according to claim 16, wherein the motive liquid flows between the ejector liquid nozzle outlet tip and the midpoint of the ejector diffuser throat in a maximum of 0.25 second.

18. The gas treatment unit according to claim 16 wherein a motive liquid flowing time between the ejector liquid nozzle outlet tip and the midpoint of the ejector diffuser throat is calculated using the formula:

$$\tau_{travel} = \frac{B_O}{\sqrt{\frac{2*g*(P_{LIQUID} - P_{MIXCHAMBER})}{\gamma_{LIQUID}}}}.$$

19. The gas treatment unit according to claim 10, wherein the absorber liquid outlet is connected to the jet-ejector liquid inlet, the jet-ejector liquid-gas outlet is connected to a two-phase separator, a liquid phase liquid outlet from the two-phase separator is connected to the liquid inlet of the regenerator, the jet-ejector gas inlet is connected to a gas source, and the separator gas outlet is connected to a consumer gas conduit.

20. The gas treatment unit according to claim 19, wherein the absorber liquid outlet is connected to the jet-ejector liquid inlet through the pump.

\* \* \* \* \*